United States Patent
May et al.

(10) Patent No.: US 11,370,676 B2
(45) Date of Patent: Jun. 28, 2022

(54) METHODS OF REMOVING POLYMERS FROM TREATMENT FLUIDS FOR USE IN SUBTERRANEAN FORMATIONS

(71) Applicant: Halliburton Energy Services, Inc., Houston, TX (US)

(72) Inventors: Preston Andrew May, Porter, TX (US); Hui Zhou, The Woodlands, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 235 days.

(21) Appl. No.: 16/703,793

(22) Filed: Dec. 4, 2019

(65) Prior Publication Data
US 2021/0171370 A1    Jun. 10, 2021

(51) Int. Cl.
| | |
|---|---|
| *C02F 1/52* | (2006.01) |
| *C09K 8/88* | (2006.01) |
| *C02F 1/36* | (2006.01) |
| *C08L 39/06* | (2006.01) |
| *C02F 101/30* | (2006.01) |

(52) U.S. Cl.
CPC ............ *C02F 1/5272* (2013.01); *C02F 1/36* (2013.01); *C02F 1/5254* (2013.01); *C09K 8/882* (2013.01); *C02F 2101/30* (2013.01); *C08L 39/06* (2013.01)

(58) Field of Classification Search
CPC .................................................. C02F 1/5272
See application file for complete search history.

(56) References Cited

U.S. PATENT DOCUMENTS

| | | |
|---|---|---|
| 5,246,684 A | 9/1993 | Brown et al. |
| 5,766,478 A | 6/1998 | Smith et al. |
| 5,891,956 A | 4/1999 | Smith et al. |
| 7,144,512 B2 | 12/2006 | Qu et al. |
| 7,172,703 B2 | 2/2007 | Javora et al. |
| 7,201,225 B2 | 4/2007 | Smith et al. |
| 7,546,874 B2 | 6/2009 | Smith et al. |
| 7,674,384 B2 | 3/2010 | Javora et al. |
| 7,736,521 B2 | 6/2010 | Sloan et al. |
| 7,905,287 B2 | 3/2011 | Oyler et al. |
| 8,123,953 B2 | 2/2012 | Gibbison |
| 9,034,180 B2 | 5/2015 | McGuire |
| 9,215,891 B2 | 12/2015 | Nazir et al. |
| 9,249,478 B2 | 2/2016 | Harrison et al. |
| 9,644,126 B2 | 5/2017 | Harrison et al. |

(Continued)

FOREIGN PATENT DOCUMENTS

| | | |
|---|---|---|
| WO | 94/24224 A1 | 10/1994 |
| WO | 2010065603 A1 | 6/2010 |

OTHER PUBLICATIONS

International Search Report and Written Opinion issued in PCT Application No. PCT/US2019/064654 dated Sep. 2, 2020, 11 pages.

*Primary Examiner* — Peter Keyworth
(74) *Attorney, Agent, or Firm* — Tenley Krueger; C. Tumey Law Group PLLC (57) ABSTRACT

Methods for removing polymers from treatment fluids for use in subterranean formations are provided. In one or more embodiments, the methods include providing a treatment fluid comprising an aqueous base fluid and a polymer comprising polyvinylpyrrolidone or a derivative thereof; and adding a precipitant to the treatment fluid to form a precipitate with at least a portion of the polymer.

19 Claims, 5 Drawing Sheets

(56) References Cited

U.S. PATENT DOCUMENTS

| | | |
|---|---|---|
| 2006/0234875 A1 | 10/2006 | Oyler et al. |
| 2014/0263089 A1* | 9/2014 | Agolli ........................ C02F 1/36 |
| | | 210/748.03 |
| 2014/0360945 A1 | 12/2014 | Vittur |
| 2016/0215196 A1 | 7/2016 | Wang et al. |
| 2016/0289541 A1 | 10/2016 | Zhou et al. |
| 2017/0136427 A1 | 5/2017 | Smith |
| 2018/0023376 A1 | 1/2018 | Davis et al. |
| 2018/0237680 A1* | 8/2018 | Hall ........................ C09K 8/887 |
| 2019/0031793 A1 | 1/2019 | Smith |
| 2019/0169479 A1 | 6/2019 | Armstead et al. |

\* cited by examiner

FIG.5A

METHODS OF REMOVING POLYMERS FROM TREATMENT FLUIDS FOR USE IN SUBTERRANEAN FORMATIONS

BACKGROUND

The present disclosure relates to methods for removing polymers from treatment fluids for use in subterranean formations.

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, drilling, fracturing, competition, and the like.

For example, while drilling an oil or gas well, a drilling fluid (or drilling mud) is typically pumped down to a drill bit during drilling operations and flowed back to the surface through an annulus defined between a drill string and the walls of the wellbore. Drilling fluids often include viscosifiers to, for example, improve the ability of the drilling fluid to remove cuttings from the wellbore and suspend cuttings.

Unconsolidated or poorly consolidated formations generally are high permeability production intervals and are often drilled with specialized drilling fluids referred to in the art as "drill-in fluids." Drill-in fluids are specially designed for drilling through a subsurface hydrocarbon reservoir portion of a wellbore. Such fluids are generally formulated to minimize formation damage and maximize production of the zones exposed by the drilling. Like drilling fluids, drill-in fluids generally include polymers for providing viscosity, suspension, and fluid loss control.

Many polymers used in drilling fluids, drill-in fluids, and other subterranean treatment fluids have been designed to be stable under the extreme conditions of subterranean formations, such as high temperatures and high pressures. After the desired application of a treatment fluid has been achieved, it is often desirable to remove the polymers from the fluid.

BRIEF DESCRIPTION OF THE DRAWINGS

These drawings illustrate certain aspects of some of the embodiments of the present disclosure and should not be used to limit or define the claims.

While embodiments of this disclosure have been depicted, such embodiments do not imply a limitation on the disclosure, and no such limitation should be inferred. The subject matter disclosed is capable of considerable modification, alteration, and equivalents in form and function, as will occur to those of ordinary skill in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation-specific decisions may be made to achieve the specific implementation goals, which may vary from one implementation to another. Moreover, it will be appreciated that such a development effort might be complex and time-consuming but would nevertheless be a routine undertaking for those of ordinary skill in the art having the benefit of the present disclosure.

The present disclosure relates to methods for removing polymers from treatment fluids for use in subterranean formations. More specifically, the present disclosure provides methods for removing one or more polymers including polyvinylpyrrolidone (PVP) or a derivative thereof from aqueous fluids that may be used to treat subterranean formations. In certain embodiments, the methods of the present disclosure may include providing a treatment fluid including an aqueous base fluid and one or more polymers comprising polyvinylpyrrolidone or a derivative thereof. In certain embodiments, the methods of the present disclosure may further include adding a precipitant to the treatment fluid and allowing the precipitant to form a precipitate with at least a portion of the polymer. In certain embodiments, the methods of the present disclosure may further include separating at least a portion of the precipitate from the aqueous base fluid. In certain embodiments, the methods of the present disclosure may further include at least partially breaking the one or more polymers. As used herein, the term "breaking" refers to the separation of a polymer molecule into two or more units, each having a lower molecular weight than the polymer.

Those of ordinary skill in the art having the benefit of the present disclosure will appreciate the types of treatment fluids including a base fluid and one or more polymers disclosed herein that may be used in accordance with the methods of the present disclosure. Examples of such treatment fluids include, but are not limited to, drill-in fluids, drilling fluids, completion fluids, workover fluids, fracturing fluids, acidizing fluids, suspension fluids, breaker fluids, packer fluids, logging fluids, spacer fluids, transition fluids, and the like.

Among the many potential advantages to the methods and compositions of the present disclosure, only some of which are alluded to herein, the compositions and methods of the present disclosure may, inter alia, aid in the removal of polymers from a fluid that was previously used to treat a subterranean formation (e.g., a drilling fluid), which may in turn reduce the viscosity and/or turbidity of the fluid and allow for at least a portion of the fluid to be recycled or reused to treat the same or another subterranean formation.

In certain embodiments, the treatment fluids of the present disclosure may include any aqueous base fluid known in the art. The term "base fluid" refers to the major component of the fluid (as opposed to components dissolved and/or suspended therein) and does not indicate any particular condition or property of that fluids such as its mass, amount, pH, etc. Aqueous base fluids that may be suitable for use in the methods of the present disclosure may include water from any source. Such aqueous base fluids may include fresh water, salt water (e.g., water containing one or more salts dissolved therein), brine (e.g., saturated salt water), seawater, or any combination thereof. In some embodiments, the aqueous base fluids may include one or more ionic species, such as those formed by salts dissolved in water. For example, seawater and/or produced water may include a variety of divalent cationic species dissolved therein. The ionic species may be any suitable ionic species known in the art that does not independently form a precipitate with the one or more polymers in the treatment fluid. In certain embodiments, the ionic species may be one or more salts selected from the group consisting of: lithium chloride, lithium bromide, lithium iodide, sodium chloride, sodium bromide, sodium iodide, sodium acetate, sodium formate, sodium citrate, potassium chloride, potassium formate, potassium iodide, potassium bromide, calcium chloride, calcium nitrate, calcium bromide, calcium iodide, magnesium chloride, magnesium bromide, magnesium sulfate, cesium formate, zinc chloride, zinc bromide, zinc iodide, cerium bromide, manganese bromide, and any combination thereof. In certain embodiments, the density of the aqueous base fluid can be adjusted to, among other purposes, provide additional particulate transport and suspension and/or control hydrostatic pressure. In certain embodiments, the pH of the aqueous base fluid may be adjusted (e.g., by a buffer or other pH adjusting agent) to a specific level, which may depend on, among other factors, the types of clays, acids, and other additives included in the fluid. One of ordinary skill in the art with the benefit of this disclosure will recognize when such density and/or pH adjustments are appropriate.

In certain embodiments, the treatment fluids of the present disclosure may include one or more polymers including polyvinylpyrrolidone (PVP) or a derivative thereof. In certain embodiments, the polymers including polyvinylpyrrolidone (PVP) or a derivative thereof may be dissolved or dispersed in the aqueous base fluid of the treatment fluid. In certain embodiments, the polymers may be linear, branched, and/or "crosslinked" with a crosslinking agent to, among other reasons, impart enhanced viscosity and/or suspension properties to the treatment fluid. In certain embodiments, the treatment fluid used in the methods of the present disclosure may have been previously used to treat at least a portion of a subterranean formation, and in such embodiments, the polymers may be or have been included in the treatment fluid in any amount sufficient to impart the desired viscosity, suspension, and/or filtration control properties for treating the subterranean formation. In certain embodiments, the one or more polymers may be included in the treatment fluid in an amount of from about 0.001 wt. % to about 10.0 wt. % by volume of the treatment fluid. In other embodiments, the one or more polymers may be included in the treatment fluid in an amount of from about 0.001 wt. % to about 5.0 wt. % by volume of the treatment fluid. In other embodiments, the one or more polymers may be included in the treatment fluid in an amount of from about 0.001 wt. % to about 3 wt. % by volume of the treatment fluid. In other embodiments, the one or more polymers may be included in the treatment fluid in an amount of from about 1.0 wt. % to about 3.0 wt. % by volume of the treatment fluid.

Those of ordinary skill in the art having the benefit of the present disclosure will recognize that the one or more polymers including polyvinylpyrrolidone or a derivative thereof may have any suitable molecular weight. In certain embodiments, the one or more polymers may have a molecular weight greater than about 6,000 g/mol. In certain embodiments, the one or more polymers may have a molecular weight from about 6,000 g/mol to about 3,000,000 g/mol. In other embodiments, the one or more polymers may have a molecular weight from about 6,000 g/mol to about 15,000 g/mol. In other embodiments, the one or more polymers may have a molecular weight from about 30,000 g/mol to about 90,000 g/mol. In other embodiments, the one or more polymers may have a molecular weight from about 40,000 g/mol to about 80,000 g/mol. In other embodiments, the one or more polymers may have a molecular weight from about 200,000 g/mol to about 500,000 g/mol. In other embodiments, the one or more polymers may have a molecular weight from about 900,000 g/mol to about 1,500,000 g/mol. In other embodiments, the one or more polymers may have a molecular weight from about 2,000,000 g/mol to about 3,000,000 g/mol.

In certain embodiments, the treatment fluids used in the methods of the present disclosure may be used or have been used to treat a subterranean formation (e.g., as a drilling fluid or drill-in fluid). Thus, the treatment fluids may also have one or more solids suspended or mixed therein, such as lost circulation materials, bridging agents, solid breakers, internal breakers, proppant, solid alkalinity control agents, solids from the subterranean formation (e.g., rock fragments generated by the drill bit during drilling), and any combination thereof. Examples of lost circulation materials or bridging agents that may be suitable include, but are not limited to, BARACARB® particulates (ground marble, available from Halliburton Energy Services, Inc.) including BARACARB® 5, BARACARB® 25, BARACARB® 50, BARACARB® 150, BARACARB® 600, BARACARB® 1200; STEELSEAL® particulates (resilient graphitic carbon, available from Halliburton Energy Services, Inc.) including STEELSEAL® powder, STEELSEAL® 50, STEELSEAL® 150, STEELSEAL® 400 and STEELSEAL® 1000; WALL-NUT® particulates (ground walnut shells, available from Halliburton Energy Services, Inc.) including WALL-NUT® M, WALL-NUT® coarse, WALL-NUT® medium, and WALL-NUT® fine; BARAPLUG® (sized salt water, available from Halliburton Energy Services, Inc.) including BARAPLUG® 20, BARAPLUG® 50, and BARAPLUG® 3/300; BARAFLAKE® (calcium carbonate and polymers, available from Halliburton Energy Services, Inc.); acid soluble bridging solids including magnesium and calcium carbonate, limestone, marble, dolomite, iron carbonate, iron oxide, calcium oxide, magnesium oxide, perborate salts and the like; and any combination thereof.

In certain embodiments, the treatment fluids of the present disclosure may include any number of additives. Examples of such additives include, but are not limited to, additional salts, surfactants, acids, diverting agents, fluid loss control additives, gas, nitrogen, carbon dioxide, surface modifying agents, tackifying agents, foamers, corrosion inhibitors, scale inhibitors, catalysts, clay stabilizers, shale inhibitors, biocides, friction reducers, antifoam agents, additional bridging agents, flocculants, $H_2S$ scavengers, $CO_2$ scavengers, oxygen scavengers, lubricants, hydrocarbons, viscosifying/gelling agents, breakers, weighting agents, relative permeability modifiers, resins, wetting agents, coating enhancement agents, filter cake removal agents, antifreeze agents (e.g., ethylene glycol), particulates, and the like.

Those of ordinary skill in the art having the benefit of the present disclosure will recognize the types of additives that may be included in the treatment fluids of the present disclosure for a particular application.

In certain embodiments, the methods of the present disclosure may include at least partially breaking the one or more polymers that include polyvinylpyrrolidone or a derivative thereof. Any technique to break the one or more polymers into smaller polymeric units may be used. Examples of breaking techniques that may be suitable for used in the method of the present disclosure include sonication, cavitation, and chemical breaking. In certain embodiments, breaking the one or more polymers may include applying a sonication technique and/or a cavitation technique to at least a portion of the treatment fluid that includes the polymers. Examples of sonication techniques that may be suitable for use in the methods of the present disclosure include, but are not limited to, submersion of an ultrasonic probe, ultrasonic horn, ultrasonic vibrator, ultrasonic homogenizer, or other sonication device into the treatment fluids; flow-through sonication, such as a flow-cell containing a sonicator; and indirect sonication (i.e., transmitting ultrasonic waves through a fluid that is indirect contact with another fluid (e.g., an ultrasonic bath)). Examples of cavitation techniques that may be suitable for use in the methods of the present disclosure include, but are not limited to, hydrodynamic cavitation such as centrifugal pumps, marine propellers, and water turbines, as well as ultrasonic induced cavitation (e.g., via sonication). Those of ordinary skill in the art having the benefit of the present disclosure will appreciate other cavitation techniques that may be used in accordance with the methods of the present disclosure. In certain embodiments, breaking the one or more polymers may include adding a chemical breaker to the treatment fluid. Examples of chemical breakers that may be suitable for use in the methods of the present disclosure include, but are not limited to, peroxides (such as hydrogen peroxide, t-butylhydroperoxide), perborates (such as sodium perborate), percarbonates, persulfates (such as ammonium, sodium, potassium persulfate), permanganates, bromates (such as sodium bromate), chlorates, hypochlorites, and any combination thereof. In some embodiments, oxidizing breakers such as those listed above may also be used in combination with one or more reducing agents, among other reasons, to lower their activation temperature. In such embodiments, the reducing agents may include, but not limited to, sulfites, bisulfites, metabisulfites, thiosulfate, iron (II), ferrous ($Fe^{2+}$) salts, ascorbic acid and salts, thiourea, amines (such as tetramethyethylenediamine), alcohols, and any combination thereof.

In certain embodiments, the methods of the present disclosure may include adding a precipitant to the treatment fluid. In such embodiments, the precipitant may form a precipitate with the polymer. In certain embodiments, the precipitate may include one or more vinylpyrrolidone monomers and the precipitant or a portion thereof bonded thereto. In certain embodiments, the precipitate may be a solid and/or a semi-solid. In certain embodiments, the precipitant may be added to the treatment fluid before breaking the polymer including polyvinylpyrrolidone or a derivative thereof. In such embodiments, the precipitate may not form until after the polymer is broken. In other embodiments, the precipitate may at least partially form before the polymer is broken. In such embodiments, the precipitate may include the polymer when the polymer is broken. In other embodiments, the precipitant may be added to the treatment fluid after breaking the polymer including polyvinylpyrrolidone or a derivative thereof. Examples of precipitants that may be used in the methods of the present disclosure include, but are not limited to, polyphenolic compounds having at least two hydroxy groups (such as tannic acid), dihydroxyphenolic compounds (such as resorcinol and resorcylic acid (e.g., 3,5-dihydroxybenzoic acid)), inorganic compounds (such as zinc bromide, zinc chloride, zinc carbonate, zinc oxide, calcium carbonate, magnesium carbonate, and magnesium oxide), and any combination thereof.

The precipitant may be added to the treatment fluid in any amount sufficient to precipitate out at least a portion of the polymer. Those of ordinary skill in the art having the benefit of the present disclosure will appreciate that the amount of precipitant added to the treatment fluid may depend on, among other things, the amount of the polymer in the treatment fluid. In certain embodiments, one or more steps of the methods of the present disclosure may be automated to be performed without human intervention. For example, the addition of the precipitate to the treatment fluid may be performed by automated equipment based on, for example, the amount of the polymer in the treatment fluid. In certain embodiments, one or more measurement devices may automatically measure the amount of the polymer in the treatment fluid, and a controller may control the amount of precipitant added to the treatment fluid by, for example, adjusting a valve coupled to a tank or vessel including the precipitant. In such embodiments, the treatment fluid may be located in a tank, vessel, or pipeline connected to the tank or vessel containing the precipitant.

In certain embodiments, the precipitant may be added to the treatment fluid in any amount sufficient to precipitate out at least about 50% of the polymer. In other embodiments, the precipitant may be added to the treatment fluid in any amount sufficient to precipitate out at least about 60% of the polymer. In other embodiments, the precipitant may be added to the treatment fluid in any amount sufficient to precipitate out at least about 70% of the polymer. In other embodiments, the precipitant may be added to the treatment fluid in any amount sufficient to precipitate out at least about 80% of the polymer. In other embodiments, the precipitant may be added to the treatment fluid in any amount sufficient to precipitate out at least about 90% of the polymer. In other embodiments, the precipitant may be added to the treatment fluid in any amount sufficient to precipitate out at least about 95% of the polymer.

In certain embodiments, the methods of the present disclosure may include separating at least a portion of the precipitate from the aqueous base fluid. The separation of the precipitate from the aqueous base fluid may be achieved through any known separation technique. Examples of such techniques include, but are not limited to, vacuum filtration, diatomaceous earth filtration, centrifugal filtration, and any combination thereof. Those of ordinary skill in the art having the benefit of the present disclosure will appreciate other separation techniques that may be used in accordance with the methods of the present disclosure In certain embodiments, as discussed above, the treatment fluids used in the methods of the present disclosure may include one or more solids (e.g., lost circulation materials and bridging agents). In such embodiments, the methods of the present disclosure also may include the use of one or more separation or removal techniques on the treatment fluids to separate the solids from the aqueous base fluid (e.g., brine). Examples of such techniques for removing solids from the aqueous base fluid may include, but are not limited to, settling, decantation, filtration, centrifugation, dissolution or dissolving (e.g., with acid), and any combination thereof. In some embodiment, the methods of the present disclosure also may include the use of other separation techniques (e.g., distillation) to remove other components (e.g., salts) from the base fluid. Those of ordinary skill in the art having the benefit of the present disclosure will appreciate other separation or removal techniques that may be used in accordance with the methods of this disclosure. In certain embodiments, these separation or removal techniques may be used before breaking the one or more polymers in the treatment fluid, before adding the precipitant to the treatment fluid, or before separating the precipitate from the aqueous based fluid. In certain embodiments, these separation or removal techniques may be used after breaking the one or more polymers in the treatment fluid, after adding the precipitant to the treatment fluid, or after separating the precipitate from the aqueous based fluid.

In certain embodiments, the methods of the present disclosure may include adding one or more additives, as described above, to the aqueous base fluid after at least a portion of the precipitate has been separated from the aqueous base fluid to form a second treatment fluid. In such embodiments, the second treatment fluid may be introduced into wellbore penetrating at least a portion of a subterranean formation. In some embodiments, a fresh based fluid (e.g., a fluid that has not yet been used to treat a subterranean formation) may be added to the second treatment fluid before it is introduced into the subterranean formation and/or the wellbore.

In certain embodiments, the methods of the present disclosure may include using the disclosed treatment fluids to carry out a variety of subterranean treatments, including but not limited to, drilling. The drilling and/or drill-in fluids disclosed herein may directly or indirectly affect one or more components or pieces of equipment associated with the preparation, delivery, recapture, recycling, reuse, and/or disposal of the drilling and/or drill-in fluids. For example, and with reference to FIG. 1, the drilling and/or drill-in fluids disclosed herein may directly or indirectly affect one or more components or pieces of equipment associated with a wellbore drilling assembly 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
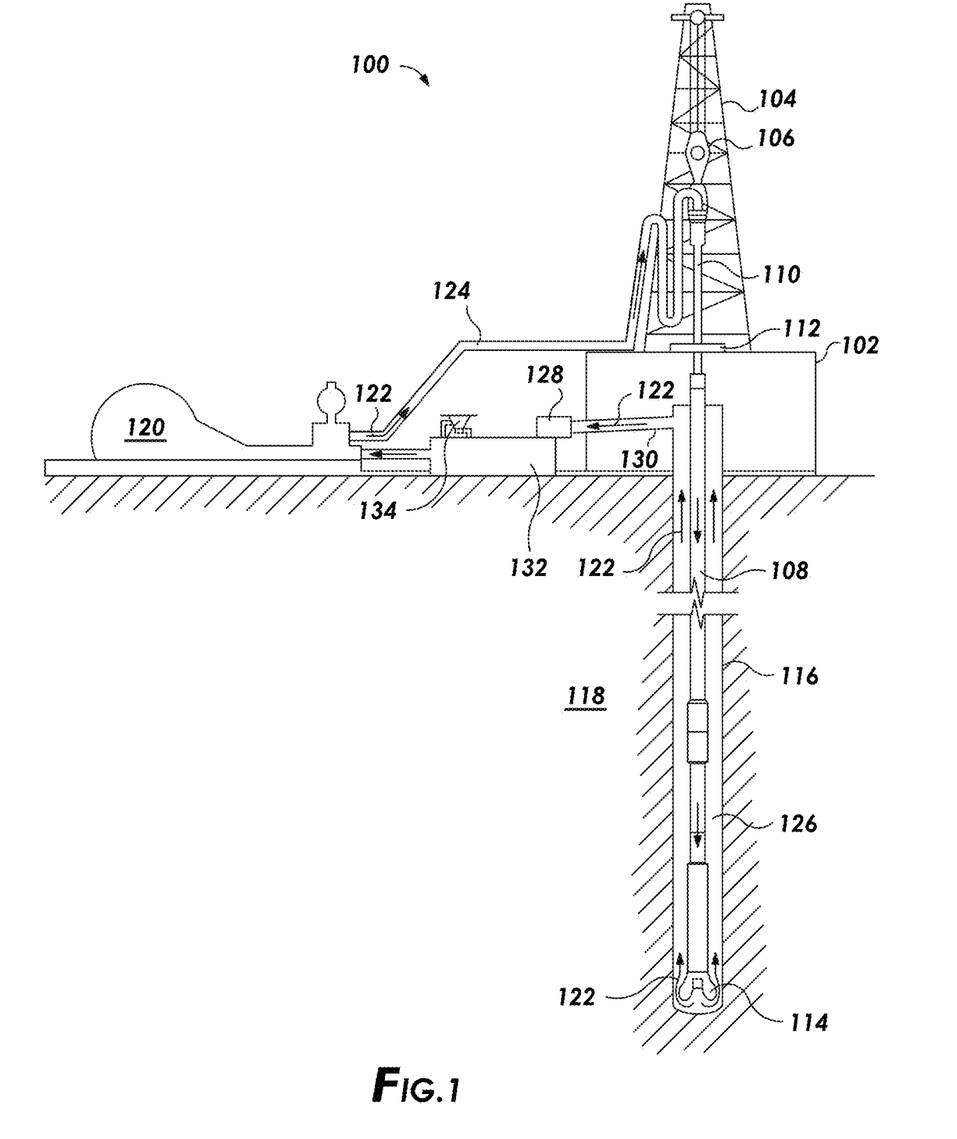
FIG. 1 is a diagram illustrating an example of a drilling assembly that may be used in accordance with certain embodiments of the present disclosure.
Figure 2A:
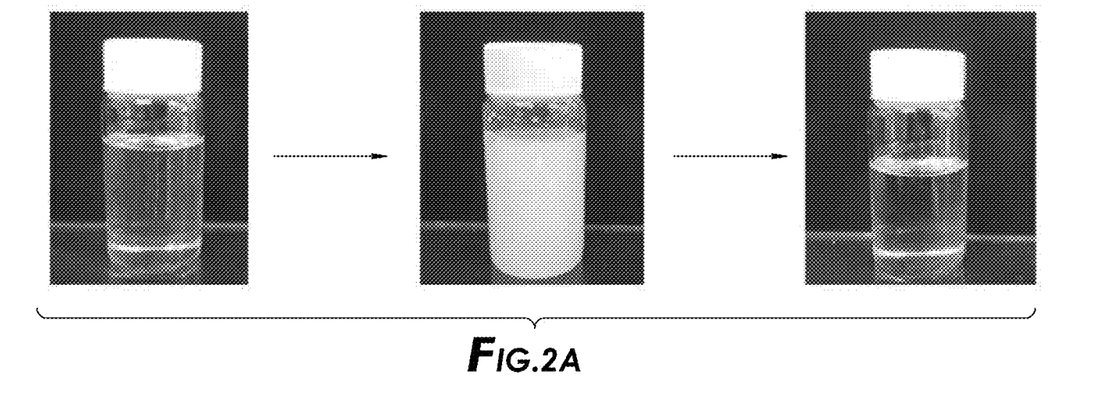
FIGS. 2A, 2B, 2C, and 2D are each a series of photographs depicting the formation and removal of a precipitate in treatment fluids in accordance with certain embodiments of the present disclosure.
Figure 2B:
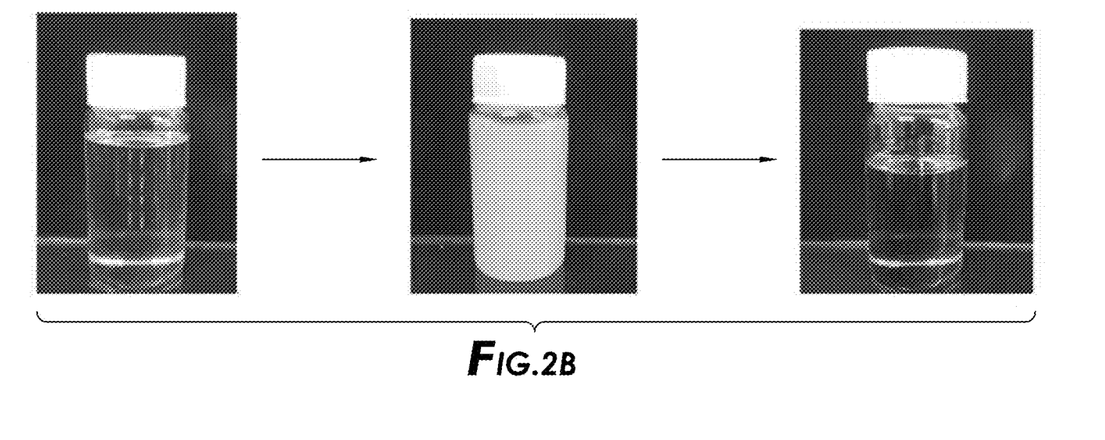
Figure 2C:
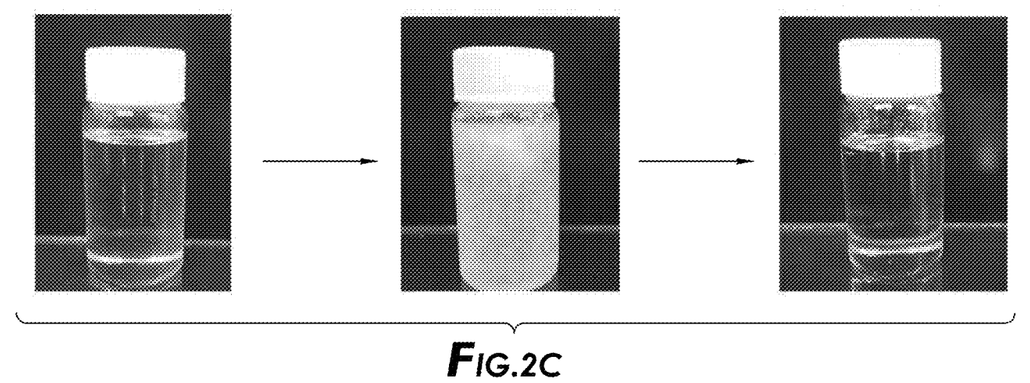
Figure 2D:
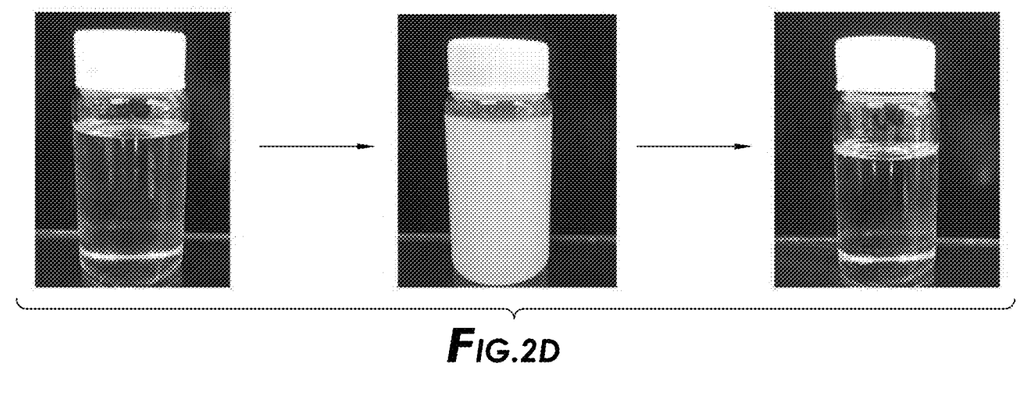

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the bit 114 rotates, it creates a borehole 116 that penetrates various subterranean formations 118.

A pump 120 (e.g., a mud pump) circulates a drilling and/or drill-in fluid 122 of the present disclosure through a feed pipe 124 and to the kelly 110, which conveys the drilling and/or drill-in fluid 122 downhole through the interior of the drill string 108 and through one or more orifices in the drill bit 114. The drilling and/or drill-in fluid 122 may then circulated back to the surface via an annulus 126 defined between the drill string 108 and the walls of the borehole 116. At the surface, the spent drilling and/or drill-in fluid 122 exits the annulus 126 and may be conveyed to one or more fluid processing unit(s) 128 via an interconnecting flow line 130. The addition of the precipitant, the sonication and/or cavitation techniques, and/or the separation or removal technique(s) disclose herein may be performed in the fluid processing unit(s) 128. After passing through the fluid processing unit(s) 128, a "cleaned" drilling and/or drill-in fluid 122 is deposited into a nearby retention pit 132 (i.e., a mud pit). In at least one embodiment, for example, there could be more than one retention pit 132, such as multiple retention pits 132 in series. Moreover, the retention pit 132 may be representative of one or more fluid storage facilities and/or units where the drilling and/or drill-in fluid 122 or any component thereof (e.g., base fluid or brine) may be stored, reconditioned, and/or regulated until recycled or reused.

While illustrated as being arranged at the outlet of the wellbore 116 via the annulus 126, those skilled in the art will readily appreciate that the fluid processing unit(s) 128 may be arranged at any other location in the drilling assembly 100, any other wellsite location, or an off-site location to facilitate its proper function, without departing from the scope of the disclosure. In certain embodiments, the spent drilling and/or drill-in fluid 122 may be transported to an off-site location. In such embodiments, the spent drilling and/or drill-in fluid 122 may be stored in a tank or vessel for transport and/or for a period of time thereafter. Depending upon the sonication and/or cavitation technique utilized in accordance with the methods of the present disclosure, in certain embodiments, a sonication and/or cavitation device disclosed herein (e.g., an ultrasonic probe) may be added to the tank or vessel containing the fluid. In other embodiments, the spent drilling and/or drill-in fluid 122 may be transferred to a sonication and/or cavitation device disclosed herein (e.g., a flow-cell or a flow-through sonication or cavitation device) that is fluidly connected to the tank or vessel.

A precipitant of the present disclosure may be stored at the off-site location in a separate tank or vessel. The precipitant of the present disclosure may be added to the spent drilling and/or drill-in fluid 122 while the fluid is in the tank or vessel, in the sonication or cavitation device, and/or after the fluid had exited the sonication or cavitation device. As such, the tank or vessel containing the precipitant may be coupled to the tank or vessel containing the spent drilling and/or drill-in fluid 122, the sonication or cavitation device, or another tank, vessel, or pipeline downstream of the sonication or cavitation device. In certain embodiments, the tank, vessel, or pipeline to which the precipitant is added may contain a mixing device to mix the precipitant with the spent drilling and/or drill-in fluid 122.

In certain embodiments, after the precipitate is added to the spent drilling and/or drill-in fluid 122, the fluid may be transferred to a separation apparatus, as discussed above, to remove at least a portion of the precipitate. In certain embodiments, the "cleaned" drilling and/or drill-in fluid with the precipitant at least partially removed may then be transferred to another separation or removal apparatus, as discussed above, to remove at least a portion of the solids (e.g., lost circulation materials and bridging agents) in the fluid. In other embodiments, the spent drilling and/or drill-in fluid 122 may be transferred to a separation or removal apparatus to remove at least a portion of the solids in the fluid prior to the addition of the precipitant and/or prior to the application of the sonication or cavitation technique. The final "cleaned" drilling and/or drill-in fluid (e.g., the aqueous base fluid) may be stored in a tank or vessel for a period of time at the off-site location or for transport to a wellsite location.

Once back at the wellsite, one or more components disclosed herein (e.g., viscosifiers, lost circulation materials, and bridging agents) may be added to the "cleaned" drilling and/or drill-in fluid 122 via a mixing hopper 134 communicably coupled to or otherwise in fluid communication with the retention pit 132. The mixing hopper 134 may include, but is not limited to, mixers and related mixing equipment known to those skilled in the art. In other embodiments, however, the components may be added to the drilling and/or drill-in fluid 122 at any other location in the drilling assembly 100, any other wellsite location, or an off-site location to facilitate its proper function.

As mentioned above, the drilling and/or drill-in fluid 122 of the present disclosure may directly or indirectly affect the components and equipment of the drilling assembly 100. For example, the disclosed drilling and/or drill-in fluid 122 may directly or indirectly affect the fluid processing unit(s) 128 which may include, but is not limited to, one or more of a shaker (e.g., shale shaker), a centrifuge, a hydrocyclone, a separator (including magnetic and electrical separators), a desilter, a desander, a filter (e.g., diatomaceous earth filters), a heat exchanger, and/or any fluid reclamation equipment. The fluid processing unit(s) 128 may further include one or more sensors, gauges, pumps, compressors, and the like used to store, monitor, regulate, and/or recondition the drilling and/or drill-in fluid 122.

The drilling and/or drill-in fluid 122 of the present disclosure may directly or indirectly affect the pump 120, which representatively includes any conduits, pipelines, trucks, tubulars, and/or pipes used to fluidically convey the drilling and/or drill-in fluid 122 downhole, any pumps, compressors, or motors (e.g., topside or downhole) used to drive the drilling and/or drill-in fluid 122 into motion, any valves or related joints used to regulate the pressure or flow rate of the drilling and/or drill-in fluid 122, and any sensors (i.e., pressure, temperature, flow rate, etc.), gauges, and/or combinations thereof, and the like. The disclosed drilling and/or drill-in fluid 122 may also directly or indirectly affect the mixing hopper 134 and the retention pit 132 and their assorted variations.

The drilling and/or drill-in fluid 122 of the present disclosure may also directly or indirectly affect the various downhole equipment and tools that may come into contact with the drilling and/or drill-in fluid 122 such as, but not limited to, the drill string 108, any floats, drill collars, mud motors, downhole motors and/or pumps associated with the drill string 108, and any MWD/LWD tools and related telemetry equipment, sensors or distributed sensors associated with the drill string 108. The disclosed drilling and/or drill-in fluid 122 may also directly or indirectly affect any downhole heat exchangers, valves and corresponding actuation devices, tool seals, packers and other wellbore isolation devices or components, and the like associated with the wellbore 116. The disclosed drilling and/or drill-in fluid 122 may also directly or indirectly affect the drill bit 114, which may include, but is not limited to, roller cone bits, PDC bits, natural diamond bits, any hole openers, reamers, coring bits, etc.

While not specifically illustrated herein, the drilling and/or drill-in fluid 122 of the present disclosure may also directly or indirectly affect any transport or delivery equipment used to convey the drilling and/or drill-in fluid 122 to the drilling assembly 100 such as, for example, any transport vessels, conduits, pipelines, trucks, tubulars, and/or pipes used to fluidically move the drilling and/or drill-in fluid 122 from one location to another, any pumps, compressors, or motors used to drive the drilling and/or drill-in fluid 122 into motion, any valves or related joints used to regulate the pressure or flow rate of the drilling and/or drill-in fluid 122, and any sensors (i.e., pressure and temperature), gauges, and/or combinations thereof, and the like.

An embodiment of the present disclosure is a method including: providing a treatment fluid comprising an aqueous base fluid and a polymer comprising polyvinylpyrrolidone or a derivative thereof; and adding a precipitant to the treatment fluid to form a precipitate with at least a portion of the polymer.

In one or more embodiments described in the preceding paragraph, separating at least a portion of the precipitate from the aqueous base fluid. In one or more embodiments described in the preceding paragraph, adding one or more additives to the aqueous base fluid after the portion of the precipitate has been separated from the aqueous base fluid to form a second treatment fluid; and introducing the second treatment fluid into at least a portion of the subterranean formation. In one or more embodiments described in the preceding paragraph, the polymer has a molecular weight greater than about 6,000 g/mol. In one or more embodiments described in the preceding paragraph, applying a sonication technique or a cavitation technique to at least a portion of the treatment fluid. In one or more embodiments described in the preceding paragraph, the sonication technique or the cavitation technique is applied before adding the precipitant to the fluid. In one or more embodiments described in the preceding paragraph, the precipitant is selected from the group consisting of: a polyphenolic compound having at least two hydroxy groups, a dihydroxyphenolic compound, zinc bromide, zinc chloride, zinc carbonate, zinc oxide, calcium carbonate, magnesium carbonate, magnesium oxide, and any combination thereof. In one or more embodiments described in the preceding paragraph, the treatment fluid was used to treat at least a portion of a subterranean formation. In one or more embodiments described in the preceding paragraph, the treatment fluid further comprises solids, and wherein the method further comprises separating or removing at least a portion of the solids from the treatment fluid.

An embodiment of the present disclosure is a method including: providing a treatment fluid comprising an aqueous base fluid and one or more polymers comprising polyvinylpyrrolidone or a derivative thereof; breaking at least a portion of the one or more polymers by applying at least one of a sonication technique, a cavitation technique, and a chemical breaker; adding a precipitant to the treatment fluid; and allowing the precipitant to form a precipitate with the one or more polymers.

In one or more embodiments described in the preceding paragraph, the precipitant is added to the treatment fluid before breaking the portion of the one or more polymers. In one or more embodiments described in the preceding paragraph, the precipitant is added to the treatment fluid after breaking the portion of the one or more polymers. In one or more embodiments described in the preceding paragraph, separating at least a portion of the precipitate from the aqueous base fluid. In one or more embodiments described in the preceding paragraph, adding one or more additives to the aqueous base fluid after the portion of the precipitate has been separated from the aqueous base fluid to form a second treatment fluid; and introducing the second treatment fluid into at least a portion of the subterranean formation. In one or more embodiments described in the preceding paragraph, the precipitant is selected from the group consisting of: a polyphenolic compound having at least two hydroxy groups, a dihydroxyphenolic compound, zinc bromide, zinc chloride, zinc carbonate, zinc oxide, calcium carbonate, magnesium carbonate, magnesium oxide, and any combination thereof.

An embodiment of the present disclosure is a method including: providing a treatment fluid comprising an aqueous base fluid and one or more polymers comprising polyvinylpyrrolidone or a derivative thereof, wherein the treatment fluid was used to treat at least a portion of a subterranean formation; adding a precipitant to the treatment fluid to form a precipitate with the one or more polymers; and separating at least a portion of the precipitate from the aqueous base fluid.

In one or more embodiments described in the preceding paragraph, applying a sonication technique or a cavitation technique to at least a portion of the treatment fluid. In one or more embodiments described in the preceding paragraph, the treatment fluid further comprises solids, and wherein the method further comprises separating or removing at least a portion of the solids from the treatment fluid. In one or more embodiments described in the preceding paragraph, adding one or more additives to the aqueous base fluid after the portion of the precipitate has been separated from the aqueous base fluid to form a second treatment fluid; and introducing the second treatment fluid into at least a portion of the subterranean formation. In one or more embodiments described in the preceding paragraph, the precipitant is selected from the group consisting of: a polyphenolic compound having at least two hydroxy groups, a dihydroxyphenolic compound, zinc bromide, zinc chloride, zinc carbonate, zinc oxide, calcium carbonate, magnesium carbonate, magnesium oxide, and any combination thereof.

EXAMPLES

To facilitate a better understanding of the present disclosure, the following examples of certain aspects of certain embodiments are given. The following examples are not the only examples that could be given according to the present disclosure and are not intended to limit the scope of the disclosure or claims.

Example 1

Linear polyvinylpyrrolidone (2 lb/bbl) having a molecular weight from about 2.1 million g/mol to about 3 million g/mol), commercially available from Ashland™ as PVP K-120 polymer, was added to a 14.2 ppg $CaBr_2$ brine (20 mL) to prepare four treatment fluid samples in accordance with certain embodiments of the present disclosure. The initial turbidity of each treatment fluid sample was measured with a turbidity meter. A solution containing 1 mL of water and 100 mg of a precipitant of the present disclosure was added to each of the four treatment fluid samples as shown in Table 1 below. As shown in FIGS. 2A, 2B, 2C, 2D, a precipitate formed in each treatment fluid sample following the addition of each precipitant. The precipitate in each sample then was separated from the $CaBr_2$ brine using filter paper and vacuum filtration, and the final turbidity of each sample was measured with a turbidity meter. The results are shown in Table 1:

TABLE 1

| FIG. | Precipitant | Precipitate formed? | Initial Turbidity | Final Turbidity |
|---|---|---|---|---|
| 2A | resorcinol | Yes | 13 | 2 |
| 2B | tannic acid | Yes | 13 | 4 |
| 2C | α-resorcylic acid (3,5-dihydroxybenzoic acid) | Yes | 13 | 3 |
| 2D | zinc bromide (19.2 ppg) | Yes | 13 | 1 |

As shown in FIGS. 2A, 2B, 2C, 2D and Table 1, the final turbidity of each treatment fluid sample was significantly lower than the initial turbidity. Thus, Example 1 demonstrates a reduction in the turbidity of the treatment fluids of the present disclosure which is attributable to removal of the polyvinylpyrrolidone from the treatment fluids.

Example 2

Figure 3:
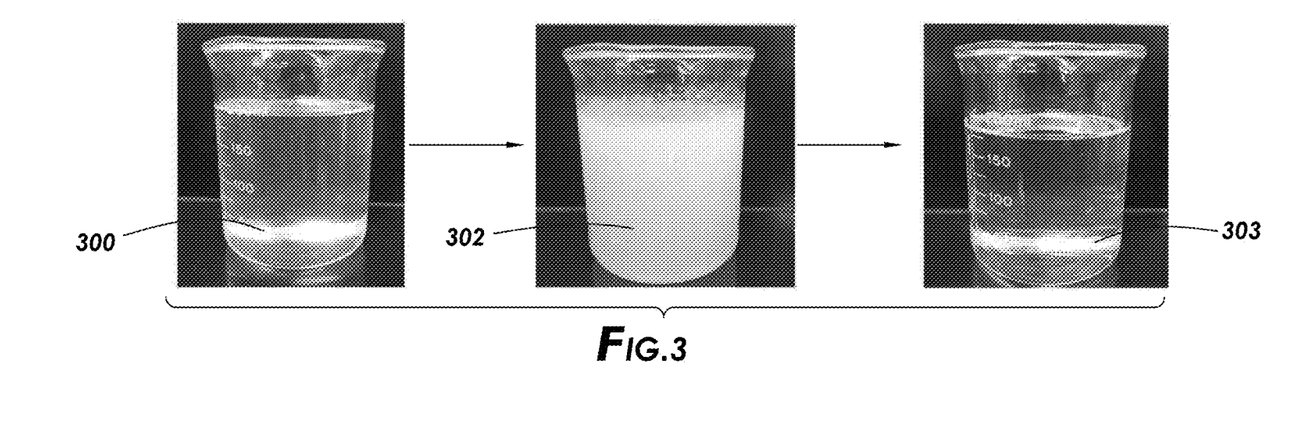
FIG. 3 is a series of photographs depicting the formation and removal of a precipitate in a treatment fluid in accordance with certain embodiments of the present disclosure.

Linear polyvinylpyrrolidone (2 lb/bbl) having a molecular weight from about 2.1 million g/mol to about 3 million g/mol), commercially available from Ashland™ as PVP K-120 polymer, was added to a 14.2 ppg $CaBr_2$ brine (200 mL) to prepare a treatment fluid sample (301) in accordance with certain embodiments of the present disclosure. As shown in Table 2 below, the initial viscosity of the treatment fluid sample was measured. Then a solution containing 1 g of resorcinol in 10 mL of water was added to the treatment fluid sample in accordance with certain embodiments of the present disclosure, and a precipitate formed in the treatment fluid sample (302), as shown in FIG. 3. The precipitate was separated from the $CaBr_2$ brine using filter paper and vacuum filtration, and the final viscosity of the treatment fluid sample (303) was measured. The results are shown in Table 2:

TABLE 2

|  | Initial Viscosity (cP) | Final Viscosity (cP) |
|---|---|---|
| 300 rpm | 13 | 7 |
| 600 rpm | 26 | 14 |

As shown in Table 2, the final viscosity of the treatment fluid sample after the precipitate was separated was significantly lower than the initial viscosity of the treatment fluid sample. Thus, Example 2 demonstrates that removing the polyvinylpyrrolidone may reduce the viscosity of the treatment fluids of the present disclosure.

Example 3

Figure 4A:
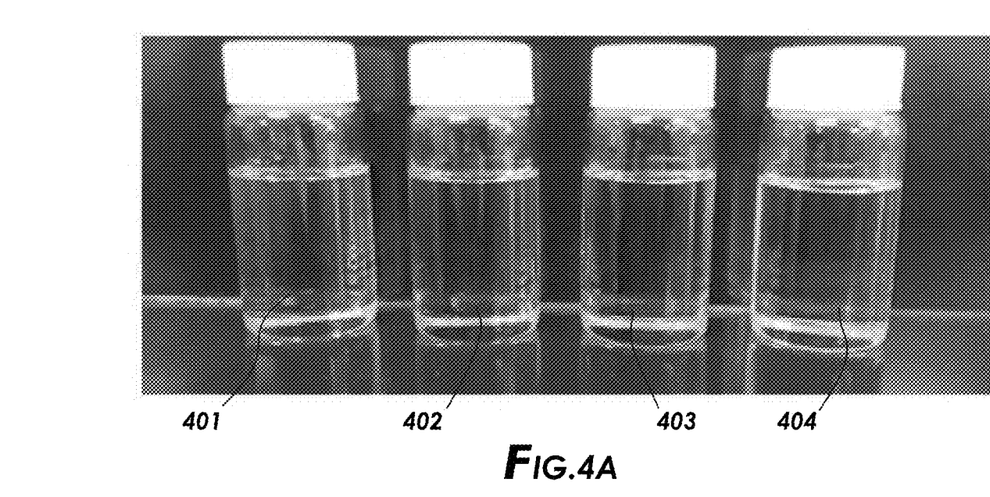
FIGS. 4A and 4B are each a series of photographs depicting the addition of precipitants of the present disclosure to treatment fluids in accordance with certain embodiments of the present disclosure.
Figure 4B:
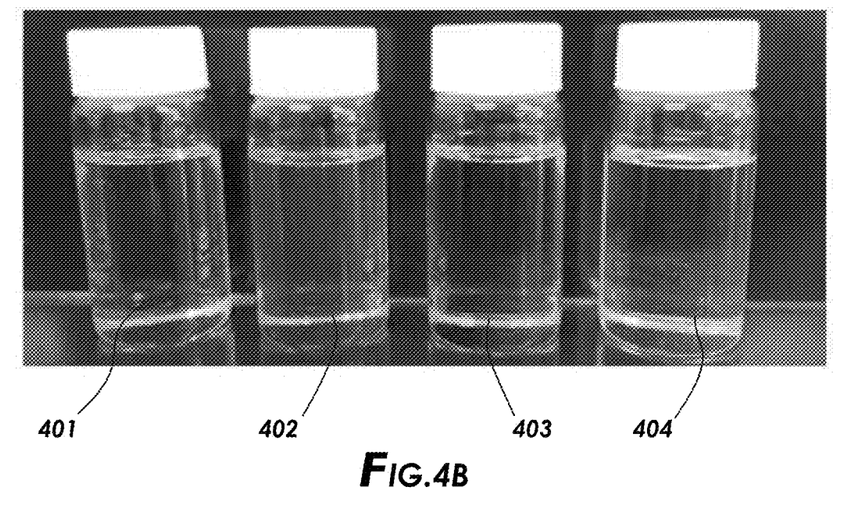

As shown in FIG. 4A, four solutions containing 1 mL of water and 100 mg of each precipitant used in Example 1 were each added to four different samples of a 14.2 ppg $CaBr_2$ brine (20 mL): resorcinol (401), tannic acid (402), α-resorcylic acid (403), and zinc bromide (404). The samples were shaken vigorously and then allowed to rest at room temperature for about 10 minutes. No precipitate formed for resorcinol (401), α-resorcylic acid (403), or zinc bromide (404). Although a precipitate initially formed for tannic acid (402), it did not persist and dissolved within about 10 minutes. As shown in FIG. 4B, no precipitate persists within each sample after about 10 minutes. Thus, Example 3 demonstrates that the precipitation observed in Examples 1 and 2 were due to the polyvinylpyrrolidone reacting with the precipitants as opposed to the $CaBr_2$ brine.

Example 4

Figure 5A:
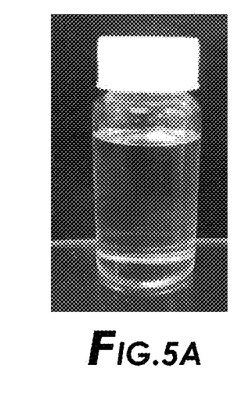
FIGS. 5A and 5B are photographs depicting the addition of a precipitant of the present disclosure to a sonicated treatment fluid in accordance with certain embodiments of the present disclosure.
Figure 5B:
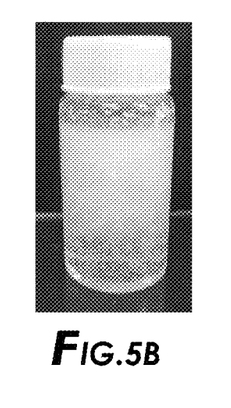

Crosslinked polyvinylpyrrolidone (8 lb/bbl), commercially available from Halliburton Energy Services, Inc. as BDF™-638, was added to a 14.2 ppg $CaBr_2$ brine (350 mL) to prepare a treatment fluid sample in accordance with certain embodiments of the present disclosure. The treatment fluid sample was sonicated, in accordance with certain embodiments of the present disclosure, for 90 minutes using a 500 watt ultrasonicator with a ¼ inch probe tip operating with an amplitude of 100 microns. The temperature of the treatment fluid sample was maintained at about room temperature by placing the treatment fluid sample in an ice water bath during sonication. As shown in FIG. 5A, a 20 mL portion of was taken from the sonicated treatment fluid sample. A solution containing 100 mg of resorcinol in 1 mL of water was added to the portion of the treatment fluid sample in accordance with certain embodiments of the present disclosure. As shown in FIG. 5B, a precipitate formed instantaneously in the portion of the treatment fluid sample. Thus, Example 4 demonstrates that the precipitants of the present disclosure are capable of removing polyvinylpyrrolidone from a treatment fluid of the present disclosure that has been ultrasonically-processed.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those of ordinary skill in the art having the benefit of the teachings herein. While numerous changes may be made by those of ordinary skill in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    providing a treatment fluid comprising an aqueous base fluid and a polymer comprising polyvinylpyrrolidone or a derivative thereof, wherein the treatment fluid was used to treat at least a portion of a subterranean formation; and
    adding a precipitant to the treatment fluid to form a precipitate with at least a portion of the polymer, wherein the precipitate is formed outside of the subterranean formation.

2. The method 1 further comprising separating at least a portion of the precipitate from the aqueous base fluid.

3. The method of claim 2 further comprising:
    adding one or more additives to the aqueous base fluid after the portion of the precipitate has been separated from the aqueous base fluid to form a second treatment fluid; and
    introducing the second treatment fluid into at least a portion of the subterranean formation.

4. The method of claim 1, wherein the polymer has a molecular weight greater than 6,000 g/mol.

5. The method of claim 1 further comprising applying a sonication technique or a cavitation technique to at least a portion of the treatment fluid.

6. The method of claim 5, wherein the sonication technique or the cavitation technique is applied before adding the precipitant to the fluid.

7. The method of claim 1, wherein the precipitant is selected from the group consisting of: a polyphenolic compound having at least two hydroxy groups, a dihydroxyphenolic compound, zinc bromide, zinc chloride, zinc carbonate, zinc oxide, calcium carbonate, magnesium carbonate, magnesium oxide, and any combination thereof.

8. The method of claim 1, wherein the treatment fluid further comprises solids, and wherein the method further comprises separating or removing at least a portion of the solids from the treatment fluid.

9. A method comprising:
    providing a treatment fluid comprising an aqueous base fluid and one or more polymers comprising polyvinylpyrrolidone or a derivative thereof, wherein the treatment fluid was used to treat at least a portion of a subterranean formation;
    breaking at least a portion of the one or more polymers by applying at least one of a sonication technique, a cavitation technique, and a chemical breaker;
    adding a precipitant to the treatment fluid; and
    allowing the precipitant to form a precipitate with the one or more polymers, wherein the precipitate is formed outside of the subterranean formation.

10. The method of claim 9, wherein the precipitant is added to the treatment fluid before breaking the portion of the one or more polymers.

11. The method of claim 9, wherein the precipitant is added to the treatment fluid after breaking the portion of the one or more polymers.

12. The method of claim 9 further comprising separating at least a portion of the precipitate from the aqueous base fluid.

13. The method of claim 12 further comprising:
    adding one or more additives to the aqueous base fluid after the portion of the precipitate has been separated from the aqueous base fluid to form a second treatment fluid; and
    introducing the second treatment fluid into at least a portion of the subterranean formation.

14. The method of claim 9, wherein the precipitant is selected from the group consisting of: a polyphenolic compound having at least two hydroxy groups, a dihydroxyphenolic compound, zinc bromide, zinc chloride, zinc carbonate, zinc oxide, calcium carbonate, magnesium carbonate, magnesium oxide, and any combination thereof.

15. A method comprising:
    providing a treatment fluid comprising an aqueous base fluid and one or more polymers comprising polyvinylpyrrolidone or a derivative thereof, wherein the treatment fluid was used to treat at least a portion of a subterranean formation;
    adding a precipitant to the treatment fluid to form a precipitate with the one or more polymers, wherein the precipitate is formed outside of the subterranean formation; and
    separating at least a portion of the precipitate from the aqueous base fluid.

16. The method of claim 15 further comprising applying a sonication technique or a cavitation technique to at least a portion of the treatment fluid.

17. The method of claim 15, wherein the treatment fluid further comprises solids, and wherein the method further comprises separating or removing at least a portion of the solids from the treatment fluid.

18. The method of claim 15 further comprising:
adding one or more additives to the aqueous base fluid after the portion of the precipitate has been separated from the aqueous base fluid to form a second treatment fluid; and
introducing the second treatment fluid into at least a portion of the subterranean formation.

19. The method of claim 15, wherein the precipitant is selected from the group consisting of: a polyphenolic compound having at least two hydroxy groups, a dihydroxyphenolic compound, zinc bromide, zinc chloride, zinc carbonate, zinc oxide, calcium carbonate, magnesium carbonate, magnesium oxide, and any combination thereof.

* * * * *